Figure 1:
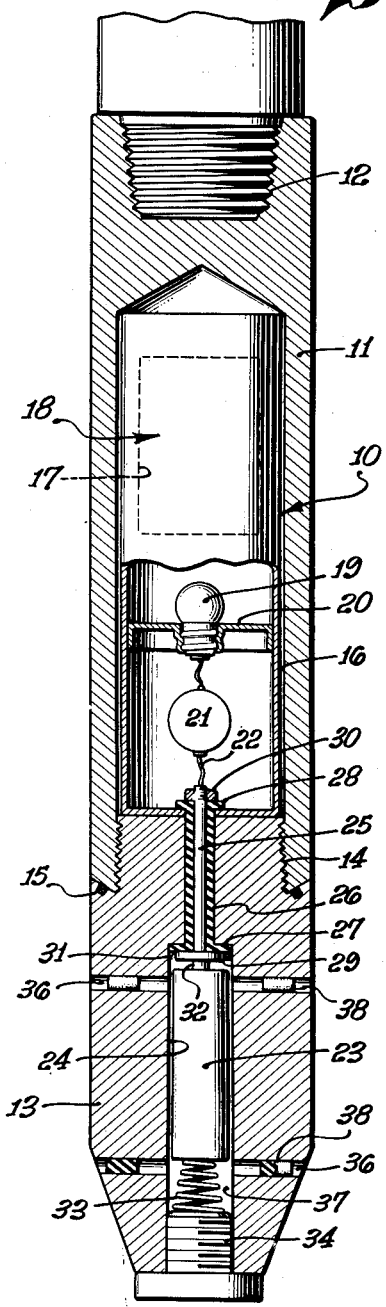

Dec. 23, 1952  J. C. HEWITT, JR  2,622,339
BATTERY ENERGIZED WELL INSTRUMENT
Filed May 16, 1949

JOHN C. HEWITT, JR.
INVENTOR.

BY Hearn White

ATTORNEY.

Patented Dec. 23, 1952

2,622,339

UNITED STATES PATENT OFFICE 2,622,339

BATTERY ENERGIZED WELL INSTRUMENT

John C. Hewitt, Jr., Long Beach, Calif.

Application May 16, 1949, Serial No. 93,460

15 Claims. (Cl. 33—205.5)

This invention has to do with improvements in battery energized instruments for use in wells at depths where the instrument is submerged in the well liquid. More particularly the invention is directed to certain innovations in such instruments whereby it becomes possible to increase the battery efficiency and output, particularly under circumstances which ordinarily are considered to limit or impair the life and efficiency of the battery.

It is to be understood that the invention is generally adaptable to various types and kinds of electrically energized instruments intended to be operated within the liquid column in a well, all of which may be characterized as comprising a fluid tight housing containing an element or device electrically energized by current supplied by a battery also carried below the liquid level in the well. As an illustrative and preferred embodiment, the invention will be described in conjunction with oil well directional recording instruments of the type employing a fluid tight housing containing an appropriate photographic recorder, and an electrically energizable lamp for illuminating the recording means.

As is known, when an instrument is lowered in the well liquid to greater depths, the instrument may be subjected to temperatures above those temperatures at which the ordinarily used batteries can retain their efficiencies. Generally the effect of the higher temperatures encountered is to vaporize, dehydrate or otherwise impair the battery electrolyte, with the result that the output and effective life of the battery are seriously reduced. In fact, in some instances such high temperatures exist as to prevent the use of submerged instrument batteries. Heretofore it has been considered necessary to isolate the battery from the well liquid as by placing the battery in the same sealed housing that contains the lamp or other element to be energized by the battery current. Accordingly, the battery has been isolated from the well fluid pressure, or pressure created by virtue of the well fluid, and given some, but often inadequate, protection from the well fluid heat.

The invention has for its major objects not only to maintain, but to actually activate the normal current potential of the battery by employing certain concepts directly contrary to the common practices of accommodating and protecting the batteries in submersed instruments. Instead of attempting to isolate the battery from temperature and pressure conditions in the well, the invention has been developed on the premise of utilizing the effects of high pressures or temperatures, or both, to maintain and, according to tests, actually increase the battery efficiencies.

Considering first the beneficial utilization of high hydrostatic pressures existing at the battery depth in the well fluid, it is found that the usually employed dry cell battery, particularly when submerged in an aqueous or non-drying well liquid, will have sustained or increased current potential when subjected to compression under high hydrostatic pressure of the liquid, notwithstanding the fact that the temperature of the well liquid is so high that under other conditions, the battery would be impaired. Maintenance or increase of the battery efficiency is believed to result from compression and compaction of its granular components, with resultant increase of the battery potential. When so compressed in a water-containing liquid, the battery electrolyte seemingly is not impaired even at high temperatures, probably by reason of the direct availability to the battery of moisture maintained as water under the existing pressures.

When the well liquid may contain little or no water, advantage may be taken of either or both the temperature and pressure conditions in the well to maintain or activate the battery potential by the applied pressure, while keeping it in exposure to or contact with water or an aqueous liquid. In this instance the battery may be contained in the presence of moisture within a medium separating the battery from the well fluid while transmitting the well fluid pressure to the battery; or the closure or separating medium may serve to isolate the battery and aqueous liquid, and transmit the well liquid heat to the aqueous liquid so that the pressure in the space containing the battery is increased (by virtue of increased vapor pressure of the contained aqueous liquid) to a degree assuring maintenance of the battery in the presence of protective moisture.

Figure 2:
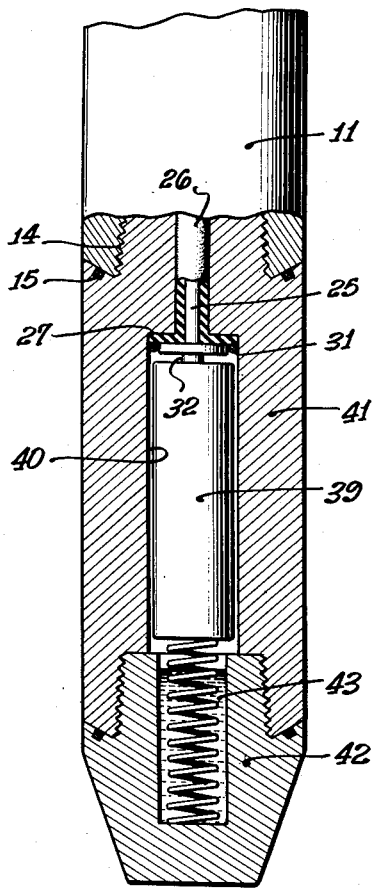

All the various features and objects of the invention, as well as the details of certain typical embodiments, will be understood more clearly from the following description of the accompanying drawing, in which:

Fig. 1 is a view showing in vertical section parts of a directional recording instrument embodying the invention; and Fig. 2 is a sectional view illustrating a variational form of the invention.

For present purposes it will suffice to illustrate generally, as in Fig. 1, the pertinent structure of a typical directional recording instrument, the light source in which is energized by current from one or more batteries to be maintained under conditions discussed in the foregoing.

The recording instrument proper, generally indicated at 10, is shown to be contained within a protective, pressure resistant body or housing 11 in the form of a hollow steel section or sub, the upper end 12 of which may be appropriately adapted for connection to a lowering cable or pipe string, as desired. A tapered nose section 13 is threaded at 14 into the lower end of the housing 11, the joint at 14 being appropriately sealed, as by an O-ring 15 to maintain the instrument chamber 16 in fluid tight isolation from the well liquid. The instrument 10 contained within the chamber 16 is shown to comprise a case or seal 17 within the upper interior of which may be positioned any known type of directional indicating and photographic recording means, diagrammatically indicated as a unit by the dotted lines 18, which receives light from the electrically energized lamp 19, a grounded lead to which is indicated at 20. Current is supplied to the lamp under control of an appropriate timing device or time control switch, conventionally indicated at 21, electrically connected to the lamp and receiving current through the lead 22.

Current is supplied to the lamp 19 under control of the timing device 21 from a battery 23 located outside the chamber 16 and shown typically to be contained within a bore 24 in the nose 13. Current flow is from the battery to the lead 22 through a conductor 25 extending through an insulator sleeve 26, the flanged ends 27 and 28 of which are engaged by head 29 in the lower end of the conductor and a nut 30 threaded on the upper end of the conductor and taken up to tighten the latter longitudinally within the insulation sleeve. The engagement of the conductor and sleeve may be sufficient to prevent fluid access to the chamber 16, although if required an additional seal may be maintained, as for example by means of an O-ring 31 confined between the head 29 and the wall of bore 24. The battery terminal 32 is pressed against the head 29 by coil spring 33 engaged against the bottom plug 34.

The battery 23 may be any suitable type of galvanic or voltaic cell, including the customarily used and so-called dry cell batteries having a self-contained electrolyte functional by virtue of the battery composition, or I may use a silver-chloride magnesium water-activated battery of the type manufactured by the Burgess Battery Company and which is electrically activated by immersion in water or an aqueous liquid. As previously indicated, serious limitations have been placed upon the use of such batteries in wells where the temperature may range around say 250° F. and upward, because of dehydration or other temperature-created impairment of the battery electrolyte. In accordance with the invention, I have discovered that from the standpoint of practical performance of the batteries, its potential output may not only be protected, but in a large percentage of instances actually improved, by maintaining the battery under sufficient high external pressure as to subject the battery material or granules to a rather high degree of compaction, and to a pressure sufficient to prevent vaporization of its electrolyte when heated to the temperatures existing at the submersion depth. The resulting compaction tends to reduce the internal resistance of the cell and, as stated, to maintain or increase its life and electrical output. Also where proper protection of performance of the battery requires its maintenance in the presence of moisture or water, provision is made for exposing the battery to moisture or an aqueous liquid while the battery is subjected to compaction.

Accordingly, where the instrument is lowered in a heated well liquid, mud or slurry containing water, the battery chamber 37 is placed in direct communication with the well liquid, as through open radial passages 36 so that the hydrostatic pressure of the liquid column above, is exerted as compacting force against the battery. Should the well liquid contain inadequate water, or no water, the required moisture may be maintained in the battery chamber 37 and the latter placed in substantially liquid tight but pressure transmitting communication with the well liquid column. Under such conditions, an adequate quantity of water or other aqueous liquid may be put into the battery chamber 37, and passages 36 closed by rubber plugs 38 which prevent entry of well liquid to the battery chamber, while being displaceable in the passages 36 to transmit the hydrostatic well fluid pressure to the battery chamber.

Fig. 2 illustrates a variational embodiment of the invention wherein, as before, the battery 39 is contained in a chamber 40 within a lower section or nose 41 of the instrument housing, the chamber being closed and sealed at its lower end by the plug 42. Here the battery chamber is closed against both liquid and pressure transmitting communication with the well liquid, but provision is made for subjecting the battery to compression in the presence of moisture, by virtue of heat transmitted from the well liquid. By placing water or other liquid 43 having a boiling temperature lower than that of the battery electrolyte, within the bottom portion of the battery chamber and limiting the chamber space occupied by the vapor, the battery is subjected to the vapor or steam pressure corresponding to the temperature to which the chamber liquid is raised by heat transference from the well liquid, and liquid will remain at 43 in the liquid phase in the presence of saturated vapor at the pressure developed in the battery chamber.

I claim:

1. An instrument for operation while submerged in the liquid in a well, comprising a body including a fluid tight housing, said housing being constructed to withstand the hydrostatic pressure at the bottom of a deep liquid-filled well, an electrically energized element in the housing, a battery carried by the body outside the housing and electrically connectible to said element, and fluid pressure displaceable means separating said battery from the well fluid and transmitting the well fluid pressure to the battery.

2. An instrument for operation while submerged in the liquid in a well, comprising a body including a fluid tight housing, said housing being constructed to withstand the hydrostatic pressure at the bottom of a deep liquid-filled well, an electrically energized element in said housing, and a battery electrically connectible to said element and contained within a chamber in the body outside said housing, said body containing a fluid pressure transmitting passage in a wall of said chamber transmitting the hydrostatic pressure of the liquid column in the well to the interior of the chamber and said battery.

3. An instrument for operation while submerged in the liquid in a well, comprising a body including a fluid tight housing, said housing being constructed to withstand the hydrostatic pressure at the bottom of a deep liquid-filled well, an electrically energized element in said housing, and a battery electrically connectible to said element contained within a chamber in the body below and outside said housing, said body containing a fluid pressure transmitting passage in a wall of said chamber transmitting the hydrostatic pressure of the liquid column in the well to the interior of the chamber and said battery.

4. An instrument for operation while submerged in the liquid in a well, comprising a body including a fluid tight housing, said housing being constructed to withstand the hydrostatic pressure at the bottom of a deep liquid-filled well, an electrically energized element in said housing, and a battery electrically connectible to said element and contained within a chamber in the body outside said housing, said chamber being open to the entry of well liquid so that the battery is subjectable to the hydrostatic pressure of the liquid column in the well above the battery.

5. An instrument for operation while submerged in the liquid in a well, comprising a body including a fluid tight housing, said housing being constructed to withstand the hydrostatic pressure at the bottom of a deep liquid-filled well, an electrically energized element in said housing, a battery electrically connectible to said element and contained within a chamber in the body outside said housing, and means associated with said chamber separating the battery from the well liquid and displaceable to subject the battery to the outside well fluid pressure.

6. An instrument for operation while submerged in the liquid in a well, comprising a body including a fluid tight housing, said housing being constructed to withstand the hydrostatic pressure at the bottom of a deep liquid-filled well, an electrically energized element in said housing, a battery electrically connectible to said element and contained within a chamber in the body outside said housing, and means for subjecting the battery to compacting pressure in excess of the pressure in said housing.

7. A directional recording instrument for operation while submerged in the liquid in a well, comprising a fluid tight housing, said housing being constructed to withstand the hydrostatic pressure at the bottom of a deep liquid-filled well, directional recording means in the housing, an electrically energized lamp in the housing for illuminating said recording means, and a battery outside said housing and electrically connectible to said lamp, and means for subjecting the battery to compacting pressure in excess of the pressure in said housing.

8. A directional recording instrument for operation while submerged in the liquid in a well, comprising a body including a fluid tight housing, said housing being constructed to withstand the hydrostatic pressure at the bottom of a deep liquid-filled well, directional recording means in the housing, an electrically energized lamp in the housing for illuminating said recording means, and a battery contained within a chamber in the body outside said housing, said body containing a fluid pressure transmitting passage in a wall of said chamber transmitting the hydrostatic pressure of the liquid column in the well to the interior of the chamber and said battery.

9. A directional recording instrument for operation while submerged in the liquid in a well, comprising a body including a fluid tight housing, said housing being constructed to withstand the hydrostatic pressure at the bottom of a deep liquid-filled well, directional recording means in the housing, an electrically energized lamp in the housing for illuminating said recording means, and a battery contained within a chamber in the body outside said housing and directly below said housing, said body containing a fluid pressure transmitting passage in a wall of said chamber transmitting the hydrostatic pressure of the liquid column in the well to the interior of the chamber and said battery.

10. An instrument for operation while submerged in the liquid in a well, comprising a body including a fluid tight housing, said housing being constructed to withstand the hydrostatic pressure at the bottom of a deep liquid-filled well, an electrically energized element in said housing, and a battery carried by the body outside said housing and electrically connectible to said element, said body being open to the transmission of the hydrostatic pressure of the liquid column in the well from the outside of the body to said battery.

11. An instrument for operation while submerged in the liquid in a well, comprising a body including a fluid tight housing, said housing being constructed to withstand the hydrostatic pressure at the bottom of a deep liquid-filled well, an electrically energized element in said housing, and a battery carried by the body outside said housing and electrically connectible to said element, said body containing a fluid pressure transmitting passage communicating the hydrostatic pressure of the liquid column in the well from the outside of the body to said battery.

12. An instrument for operation while submerged in the liquid in a well, comprising a body including a fluid tight housing, said housing being constructed to withstand the hydrostatic pressure at the bottom of a deep liquid-filled well, an electrically energized element in said housing, and a battery carried by the body outside said housing and electrically connectible to said element, said body being open to passage of the liquid in the well from the outside of the body into direct contact with said battery.

13. An instrument for operation while submerged in the liquid in a well, comprising a body including a fluid tight housing, said housing being constructed to withstand the hydrostatic pressure at the bottom of a deep liquid-filled well, an electrically energized element in the housing, a battery carried by the body outside the housing and electrically connectible to said element, fluid pressure displaceable means separating said battery from the well fluid and transmitting the well fluid pressure to the battery, and an aqueous liquid carried in the body in contact with the battery and separated by said means from the well liquid.

14. Apparatus for operation while submerged in the liquid in a well, comprising a fluid tight housing constructed to withstand the hydrostatic pressure at the bottom of a deep liquid filled well, an electrically energized element in said housing, a battery at the outside of said housing electrically connectible to said element, and means supporting the battery at the outside of the housing, there being a pressure transmitting space communicating the hydrostatic pressure of the liquid column in the well to the battery.

15. Apparatus for operation while submerged in the liquid in a well, comprising a fluid tight housing constructed to withstand the hydrostatic pressure at the bottom of a deep liquid filled well, an electrically energized element in said housing, a battery at the outside of said housing electrically connectible to said element, and means supporting the battery at the outside of the housing, there being a fluid passing space placing said battery in direct contact with the liquid in the well.

JOHN C. HEWITT, JR.

REFERENCES CITED

The following references are of record in the file of this patent:

UNITED STATES PATENTS

| Number | Name | Date |
|---|---|---|
| 129,148 | Linke | July 16, 1872 |
| 1,011,992 | Ordway et al. | Dec. 19, 1911 |
| 1,158,894 | Christofferson | Nov. 2, 1915 |
| 1,187,519 | Galvin | June 20, 1916 |
| 1,801,132 | Anderson | Apr. 14, 1931 |
| 2,109,813 | Winckler | Mar. 1, 1938 |
| 2,116,350 | Hewitt, Jr. | May 3, 1938 |
| 2,303,988 | Christensen | Dec. 1, 1942 |
| 2,366,929 | Pfeil | Jan. 9, 1945 |
| 2,437,422 | Dunham | Mar. 9, 1948 |

FOREIGN PATENTS

| Number | Country | Date |
|---|---|---|
| 2,084 | Great Britain | 1871 |

OTHER REFERENCES

Vinal et al., "Electrical Characteristics of Dry Cells," Metallurgical Engineering, vol. 27, No. 11, September 1922, pages 546–551. Pages 546 and 547 relied upon.